Patented Feb. 28, 1933

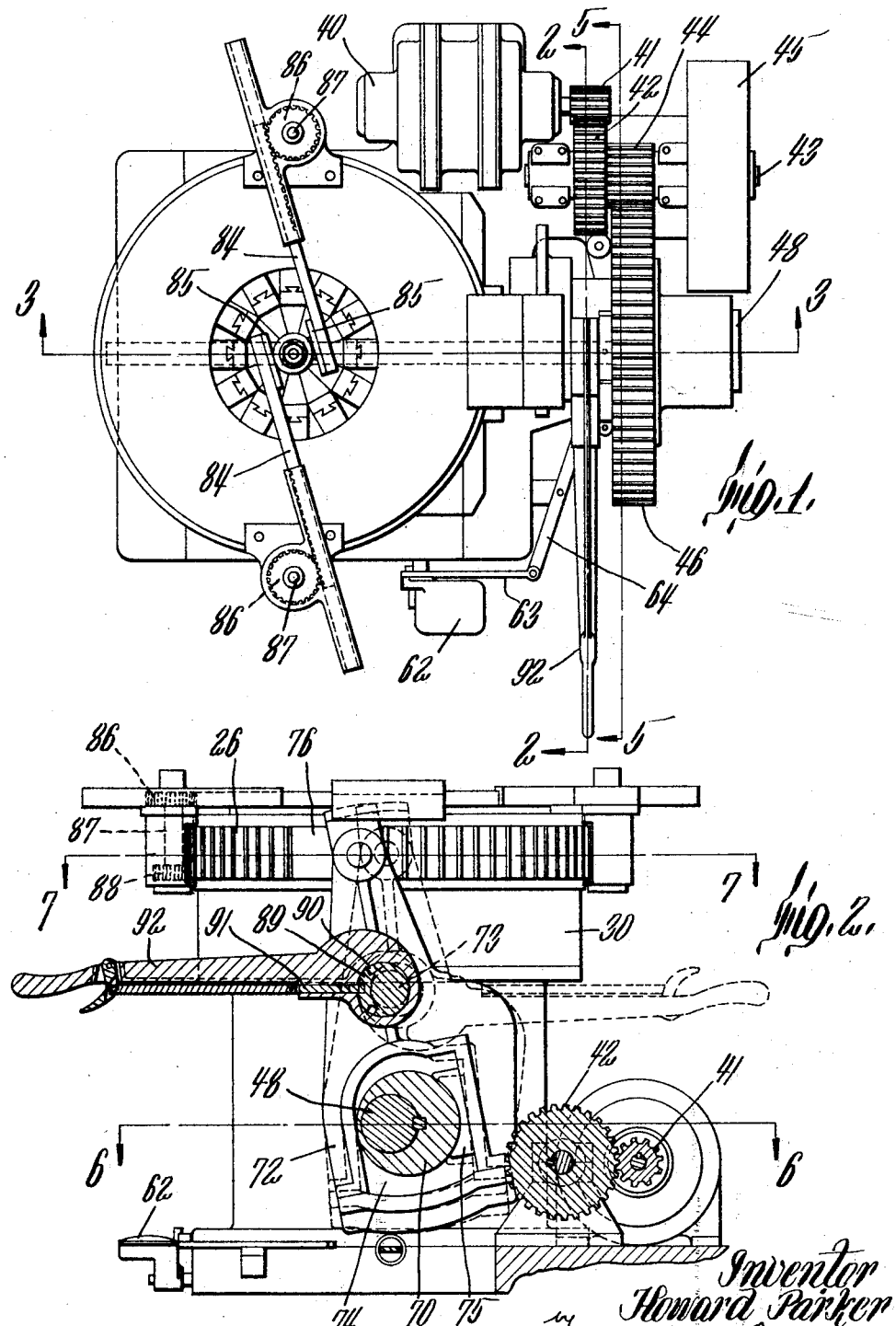

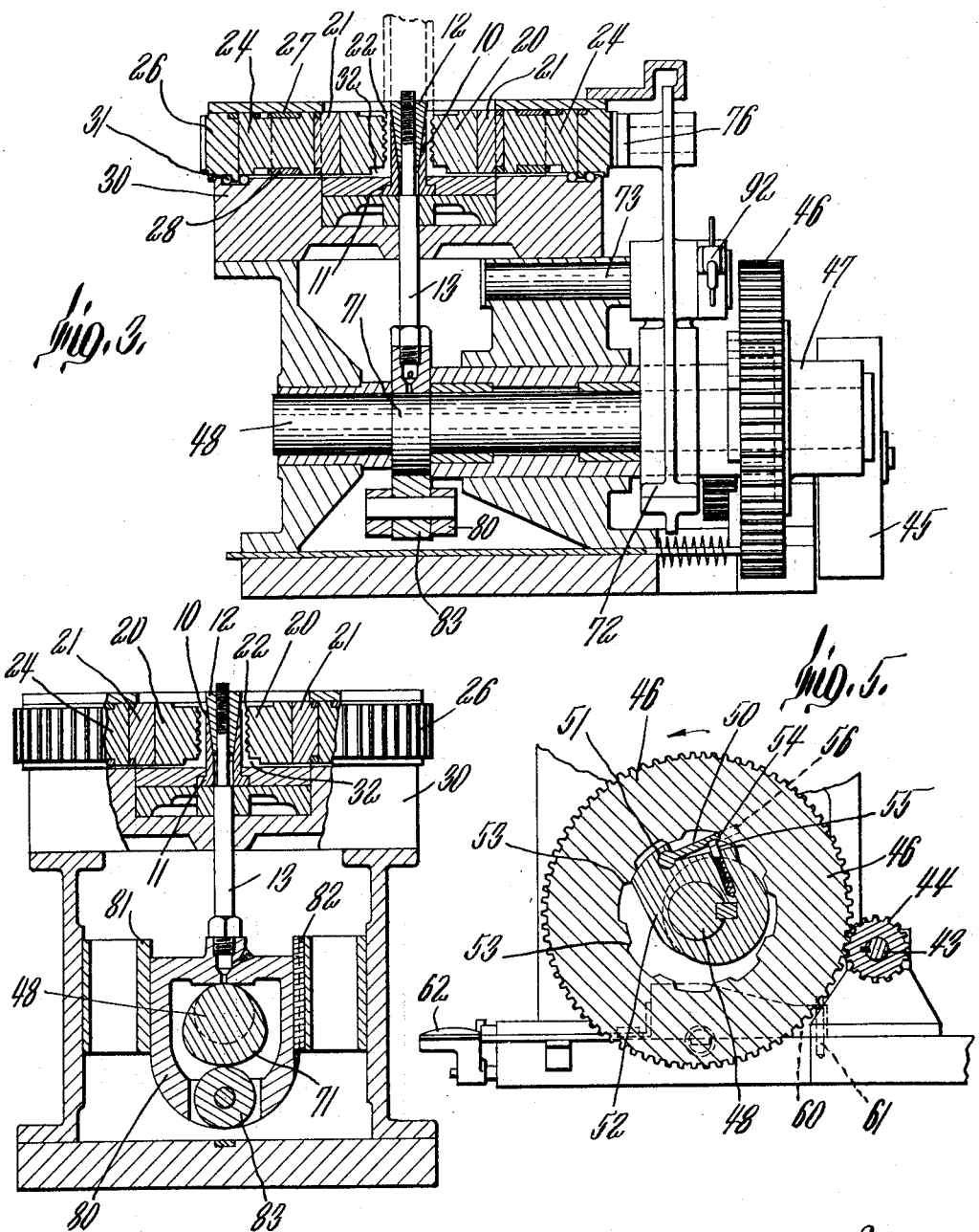

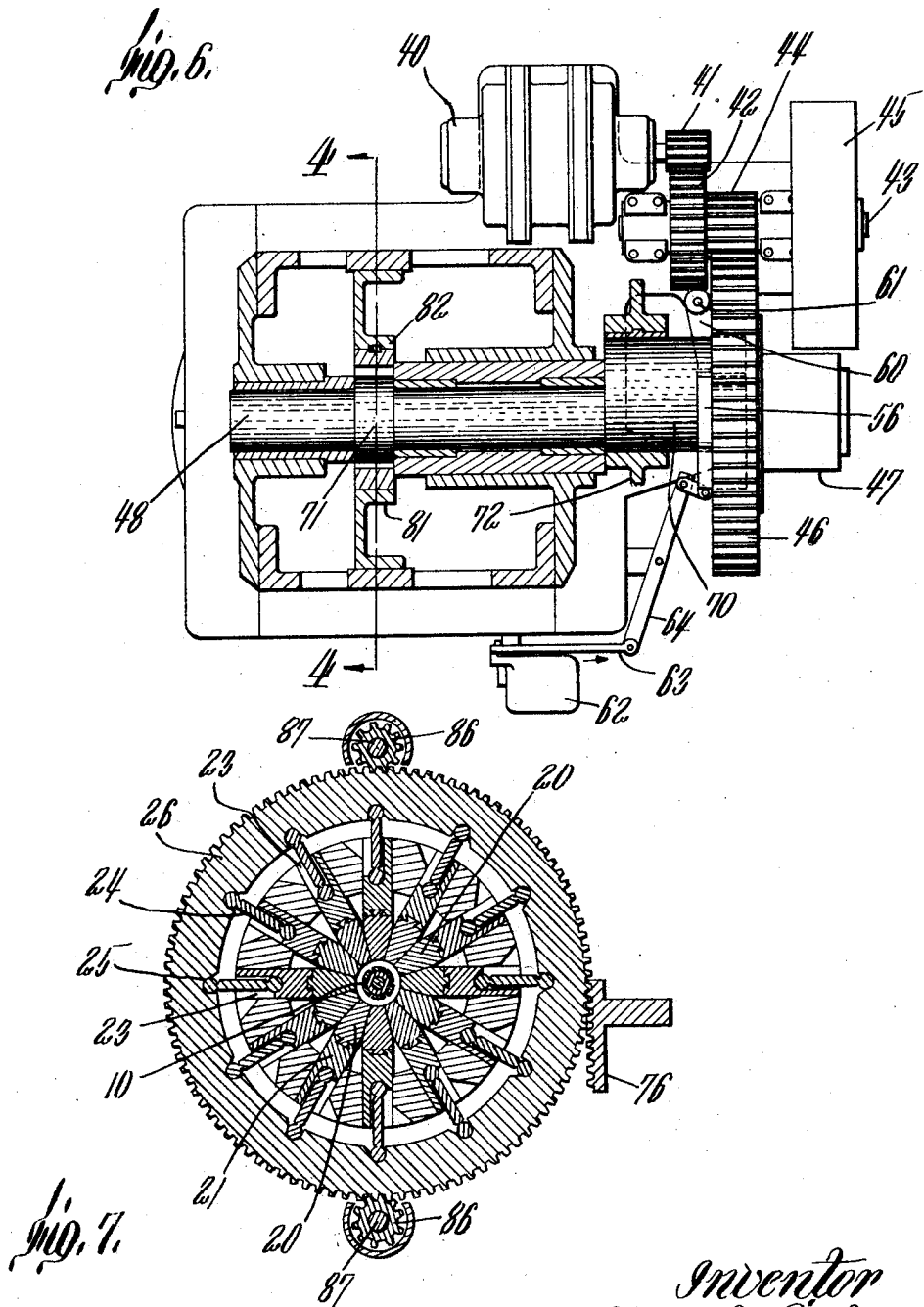

1,899,291

UNITED STATES PATENT OFFICE

HOWARD PARKER, OF BERLIN, NEW HAMPSHIRE, ASSIGNOR TO BROWN COMPANY, OF BERLIN, NEW HAMPSHIRE, A CORPORATION OF MAINE

MECHANISM FOR SQUEEZING TUBE ENDS

Application filed July 8, 1930. Serial No. 466,441.

This invention relates to mechanism for squeezing the ends of a tube of compressible material such as fiber. Such squeezing may be for the purpose of compacting the end portions and truing the inner and outer diameters to receive a metal ferrule or cap, or the pressing may be done after a collar or coupling member such as described and illustrated in my application Serial No. 437,693, filed March 21, 1930, is slipped over the end of a tube. The mechanism hereinafter described is adapted to exert high pressures on the end portions of a tube and is thus adapted for use on tubes of dense fibrous material which has only small compressibility.

The mechanism may be used for operating on tubes which are made of several layers of paper strips wound helically one on the other in sufficient numbers to build up the desired wall thickness. It is also adapted for use on fiber tubes made by rolling a sheet of wet pulp upon itself in successive convolutions until the desired wall thickness is built up, the tube being wound under considerable pressure to cause a thorough interfelting between the successive convolutions, and thereafter drying the tube. If the mechanism is used for securing coupling members on the end portions of such tubes, the external pressure on the coupling members may be applied through compressing members which have wavy or serrated surfaces so that a series of rings are pressed into the surface of the coupling member, the pressed portions being pushed inwardly to indent the wall of the tube and thus to lock the coupling member securely on the end of the tube.

For a more complete understanding of the invention, reference may be had to the description thereof which follows and to the drawings of which,—

Figure 1 is a plan view of apparatus embodying the invention.

Figure 2 is a section on the line 2—2 of Figure 1.

Figure 3 is a section on the line 3—3 of Figure 1.

Figure 4 is a partial section on the line 4—4 of Figure 6.

Figure 5 is a section on the line 5—5 of Figure 1.

Figure 6 is a section on the line 6—6 of Figure 2.

Figure 7 is a section on the line 7—7 of Figure 2.

The mechanism comprises, in brief, an expanding mandrel adapted to enter into the end of a tube and to be expanded therein to the standard internal tube diameter, a circular series of pressure fingers adapted to be pressed against the outer wall of the tube opposite the mandrel, and mechanism for operating these devices in timed relation.

As illustrated in Figures 4 and 7 the mandrel on which the end of a tube is placed may comprise a split cylinder 10 consisting of a plurality of fingers rising from a ring 11. The inner faces of the fingers of the cylinder 10 are beveled toward their upper ends to receive a conical wedging member 12 which is movable downwardly to spread the fingers of the cylinders 10, or upwardly to allow the fingers to spring toward each other. The wedging member 12 may be secured to a rod 13 which passes downwardly through the cylinder 10 and is actuated by means hereinafter described in detail.

Surrounding the cylinder 10 and suitably spaced therefrom are a number of pressure fingers arranged in a circular series, as shown in Figure 7, so that their inner ends are adapted to form a cylinder. Each finger may comprise an inner portion 20 which may be dovetailed or otherwise secured to an outer portion 21. The inner face of the inner portion 20 may be grooved or serrated as at 22 for the purpose of indenting a series of rings in the surface of a tube positioned on the mandrel. The pressure fingers are moved inwardly and outwardly by toggle mechanism illustrated in Figure 7. Each of the outer members 21 of the pressure fingers is cut away as at 23 to receive the inner end of a toggle member 24, the outer end of this member being received in a suitable recess 25 cut in the inner surface of a ring gear 26.

As shown in Figure 3, the toggle members 24 may each consist of a plate having an upper and a lower recess to receive rings 27, 28 which help to hold them in position. The pressure fingers, the toggles, and the gear ring 26 are all supported on a heavy block 30, the gear ring being mounted on ball bearings 31 which reduce frictional resistance. The inner portions 20 of the pressure fingers may be provided with recesses 32 at the lower ends of their contact faces to receive the flange of a coupling member which may be on the end of a tube. As is evident from Figure 7, a clockwise rotation of the gear ring 26 through a suitable angle will operate the toggles to press the fingers inwardly to the position shown in this figure. Rotation of the ring gear through a suitable angle in the opposite or counterclockwise direction will draw the fingers radially outward away from the tube end.

For the operation of the mandrel and the pressure fingers a suitable source of power, such as a motor 40, may be provided. As shown in Figure 1 this motor may drive a pinion 41 which meshes with a gear 42 mounted on a shaft 43. This shaft may also have a pinion 44 and a fly wheel 45 fixed thereon, the purpose of the fly wheel being to provide momentum to carry the apparatus past the point of maximum pressure against the work without unduly loading the motor 40. The pinion 44 meshes with a ring gear 46 which has a hub portion 47 loosely mounted on a shaft 48. Fixed to the shaft 48 is a clutch mechanism adapted to engage within the constantly driven ring gear 46 so that the shaft may be connected therewith and disconnected therefrom at will. The clutch mechanism may comprise a dog 50 which is hinged as at 51 to a block 52 keyed to the shaft 48. The inner surface of the ring gear 46 is provided with a series of recesses having shoulders 53 presented toward the direction of motion of the ring gear. The dog 50 has an edge 54 which is adapted to be moved into the path of any one of the shoulders 53. When the dog 54 is engaged by a shoulder 53 of the ring gear, the rotation of the ring gear drives the shaft 48 by pushing against the dog 50. The dog may be swung inwardly to clear the shoulders 53 and thus to permit the gear to rotate freely without driving the shaft 48. A spring-pressed plunger 55 may be provided to press the dog resiliently into the path of the shoulders 53.

In order to disengage the dog 50 from the gear 46, the dog may be provided with an ear 56. A cam block 60 is provided to engage this ear to move it radially inward so as to spring the dog 50 clear of the shoulders 53. The cam block may be hinged at one end as at 61 and may be swung into or out of operative position as by a suitable treadle 62 which is connected by a link 63 and a lever 64 with the cam member 60. Normally the cam block 60 is in operative position to hold the dog 50 inwardly to clear the shoulders 53. If the treadle 62 is depressed by the operator the cam block 60 is swung to inoperative position, thus permitting the dog 50 to be swung outward by the plunger 55 so as to be engaged by the nearest shoulder 53. This results in the driving of the shaft 48 by the rotation of the gear 46 until the treadle 62 is released. The releasing of this treadle permits the cam 60 to swing back into operative position where it is engaged by the dog 50 when the latter reaches it. This engagement results in the inward swinging of the dog to clear the shoulder 53 and thus to disconnect the shaft 48 from the gear 46. This arrangement ensures stopping of the shaft 48 in substantially the same angular position each time.

Mounted on the shaft 48 are a pair of eccentric cams 70 and 71. The cam 70, as illustrated in Figure 2, is a cylinder mounted eccentrically on the shaft 48 to rotate within a rocking frame 72 which is loosely mounted on a shaft 73. The lower portion of the frame 72 is formed with an opening 74 within which the eccentric cam 70 revolves. One side of the cam 70 rests against one side of the opening 74. The opposite side of the cam 70 rests against a saddle 75 which is slidable on the opposite side of the opening 74. Thus rotation of the shaft 48 causes a rocking movement of the frame 72 about the shaft 73. The upper end of the frame 72 is pivotally connected to a rack 76 which meshes with the ring gear 26, as illustrated in Figure 7. Thus the rocking motion of the frame 72 results in a rotation of the ring gear 26 back and forth through a small angle, this angle being sufficient to cause the pressure fingers to move in and out to and from their pressing position shown in Figure 7.

The eccentric cam 71 revolves within a frame or strap 80 which is adapted to slide up and down in suitable guides 81, 82. The upper and lower surfaces of the cam 71 are constantly in contact with the strap 80, all the diameters of the cam 71 through the axis of the shaft 48 being equal. The strap 80 is secured to the lower end of the rod 13 and is connected thereby to the conical wedge 12 which presses the fingers of the cylinder 10. It is evident from Figure 4 that the downward movement of the strap 80 expands the mandrel while the upward movement of the strap 80 permits the mandrel to contract. Since it is the expanding movement which is resisted by the work, the downward stroke of the strap 80 is its working stroke, so that a roller 83 may be provided thereon to take the thrust of the cam 71 without excessive friction. The cams 70 and 71 both being on a common shaft may be readily synchronized so that the actions of the mandrel and of the pressure fingers have a predetermined timed relation. In the apparatus illustrated the mechanism is arranged so that the expansion of the mandrel and the inward movement of the pressure fingers begin substantially at the same moment. Owing to the shapes of the eccentric cams 70 and 71, the mandrel is fully expanded before the fingers reach their innermost position of pressure against the work. Hence during the latter part of the inward stroke of the fingers, the tube wall is solidly backed by the fully expanded mandrel which stays fully expanded until after the fingers have well begun their outward movement. By altering the angular relation between the two cams 70 and 71, the timed relation between the movements of the mandrel and pressure fingers can be modified. Since it is desirable that the machine stop in a position in which the mandrel is contracted and the pressure fingers are wholly retracted from the tube, the arrangement of the cam members 70 and 71 on the shaft 48 is such that when the dog 50 strikes the stopping cam 60 so as to be disengaged from the driven gear 46, the shaft 48 stops in a definite angular position corresponding to the contracted position of the mandrel and the retracted position of the pressure fingers.

In affixing a coupling member on the end of a tube, it is usually desirable to squeeze the coupling member a number of times, and to rotate the tube slightly between successive squeezes so as to produce an evenly pressed end. The mechanism is, therefore, provided with means for rotating the tube automatically between squeezes so that all points of the periphery will be equally pressed. To this end I may provide a pair of racks 84. On the end of each rack is a suitable friction pad 85 adapted to engage against the side of a tube which is inserted for pressing. Each rack is meshed with a pinion 86, the pinion being mounted on a short shaft 87 which carries a second pinion 88 meshed with the gear 26. The racks 84 are thus moved longitudinally a short distance each time the gear 26 is rotated through its small angle. This tends to rotate the tube since the frictional pads 85 rub against the sides of the tube. During a portion of the motion of the racks 84, the tube is gripped by the mandrel so that it is only during the latter part of their outward motion that the tube is released to be turned by them through a small angle. Thus the work is turned after each press, so that the next succeeding movement of each of the fingers would press it against another portion of the periphery of the tube.

The machine may be adapted for use with different sizes of tubes. To this end the travel of the rack 76 may be modified so as to change the extent of inward movement of the fingers. The movement of the rack 76 is controlled by the action of the frame 72 which is loosely mounted on the shaft 73. In order to modify the travel of the rack 76 I may provide an eccentric 89 on the shaft 73 to serve as the pivot on which the frame 72 may rock. If the shaft 73 with the eccentric 89 is adjustably turned to a different angular position, the extent of travel of the rack 76 will thus be altered and the inward movement of the pressure fingers will likewise be altered. In order to determine definitely the limits of throw or travel of the rack 76, I may provide a number of notches 90 in the eccentric 89, these notches to be selectively engaged by a rod 91 carried by a lever 92 which is loosely mounted on the eccentric 89. When the lever is engaged in the notch 90 and is moved to the position shown in Figure 2, the inward movement of the pressure fingers is definitely determined. By releasing the rod 91 from engagement in its notch and moving it into engagement with another notch, then swinging the lever to the position shown in Figure 2, the inward movement of the pressure fingers may be modified to suit tubes of different diameter. In case it is desired to operate on a tube having a diameter not within the range afforded by the notches 90, the inner portions 20 of the pressure fingers may be removed and replaced by fingers of greater or smaller length according to the diameter of tube to be worked on. In case of a change of squeezing mechanism to work on a tube of different diameter, the mandrel is replaced by a mandrel of suitable size for the tube to be pressed.

In securing a flanged coupling member on the end of a tube, it is necessary to insert the flange down through the center of the mechanism so that it is below the pressure fingers when pressure is applied. In order to permit the insertion of this flange member in a machine it is necessary to withdraw the pressure fingers outwardly from their normal retracted position. To this end the lever 92 may be swung over to the position shown in dotted lines in Figure 2. This rotation of the lever 92 on the eccentric 89 moves the rack 76 to its extreme finger retracting position so that the fingers are pulled out far enough to permit the insertion of the flanged coupling member.

I claim:

1. Mechanism of the class described comprising a mandrel adapted to receive the end portion of a tube, means for expanding said mandrel within said tube, a circular series of pressure fingers adapted to be moved against the outer surface of the tube, means for moving said fingers simultaneously to their work-engaging position in predetermined timed sequence to the expansion of said mandrel, and means for automatically turning the tube on its mandrel after each application of pressure.

2. Mechanism of the class described comprising a mandrel adapted to receive the end portion of a tube, a circular series of pressure fingers surrounding said mandrel and adapted to be moved inwardly from a normal retracted position into pressing engagement with the outer surface of the tube, means for expanding said mandrel and moving said fingers inwardly to pressing position, and means actuable to retract said fingers beyond their normally retracted position.

3. Mechanism of the class described comprising a mandrel adapted to receive the end portion of a tube, a circular series of pressure fingers surrounding said mandrel and simultaneously movable inwardly into pressing engagement with the outer surface of the tube, means for expanding said mandrel and moving said fingers inwardly so that the mandrel is fully expanded before the fingers complete their inward movement, and for contracting said mandrel and moving said fingers outwardly so that the contracting movement begins after the fingers have started their outward movement.

4. Apparatus of the class described comprising an expansible mandrel adapted to receive the end portion of a tube, a ring of pressure fingers simultaneously and radially movable to and from engagement with said tube, means for reciprocating said fingers, said means including a rocking lever pivoted at a point between the ends thereof, and means for adjustably shifting the rocking axis of said lever to alter the operating stroke of said fingers.

In testimony whereof I have affixed my signature.

HOWARD PARKER.